UNITED STATES PATENT OFFICE.

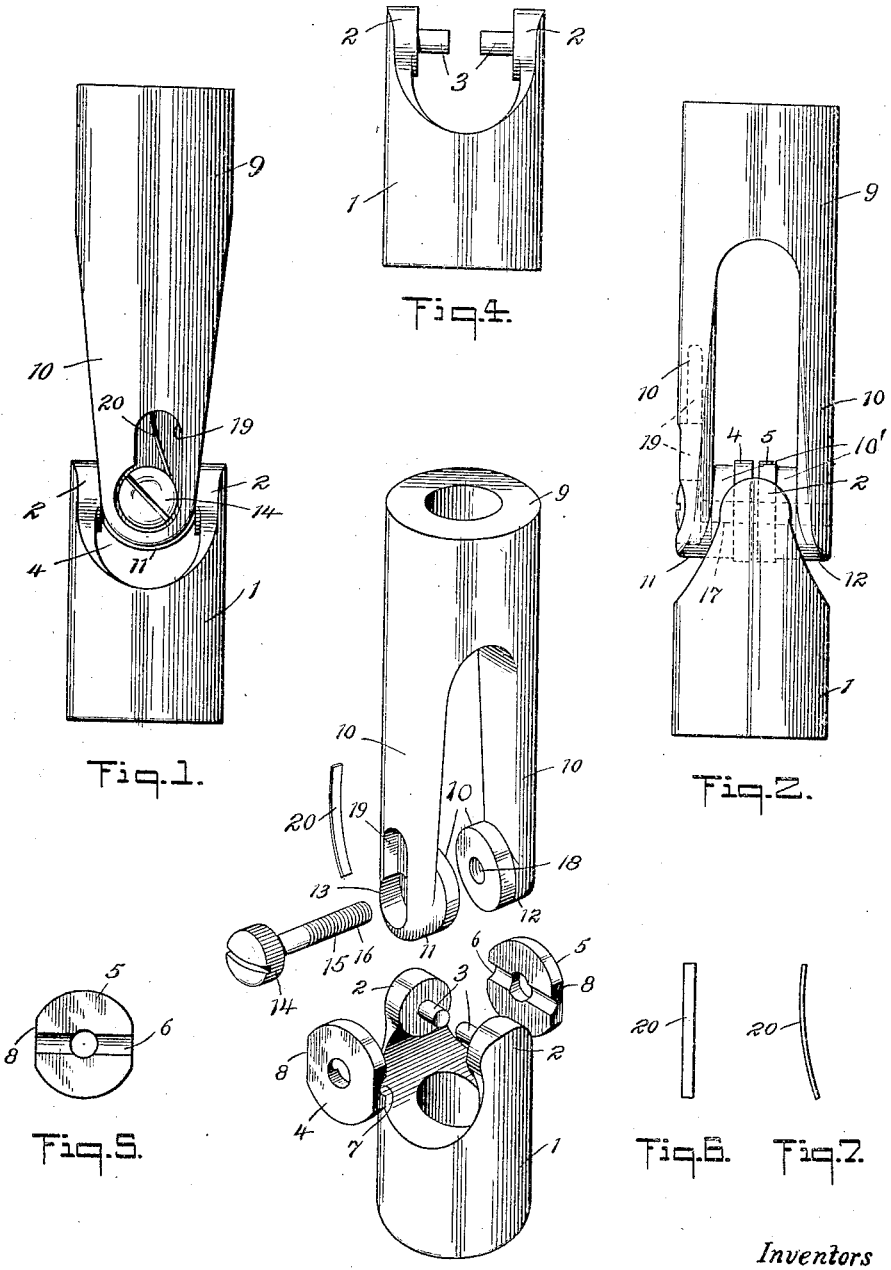

FRANK B. LOCKTON AND CARL E. CHRISTOPHEL, OF PEARL RIVER, NEW YORK.

UNIVERSAL JOINT OR COUPLING.

1,354,912.  Specification of Letters Patent.  Patented Oct. 5, 1920.

Application filed June 26, 1918. Serial No. 242,003.

*To all whom it may concern:*

Be it known that we, FRANK B. LOCKTON, a citizen of the United States, and resident of Pearl River, in the county of Rockland and State of New York, and CARL E. CHRISTOPHEL, a subject of the German Emperor, residing at Pearl River, county of Rockland, State of New York, have invented certain new and useful Improvements in Universal Joints or Couplings, of which the following is a specification.

This invention relates to universal joints or couplings and has for its primary object to provide universal joints or couplings made up of parts of improved simplicity and economy, which are readily assembled, durable in service and in which the wear on the several parts may be taken up in an improved manner. More specific objects of invention will appear in the specification and be pointed out in the appended claims, reference being had to the accompanying drawings, which show the preferred embodiment of our invention.

In the drawings:

Figure 1 is a top plan view of a universal joint or coupling constructed in accordance with the principles of the present invention;

Fig. 2 is a side elevation of the same;

Fig. 3 is a perspective view of the several parts of the joint or coupling segregated, but in proper relative position to be assembled;

Fig. 4 is a plan view of one of the shaft sockets detached.

Fig. 5 is a detail of one of the plates or collars detached; and

Figs. 6 and 7 are details of the spring for locking a stud or bolt.

Referring more particularly to the drawings, the present embodiment of our invention comprises a shaft socket 1 (shown in detail in Fig. 4), provided with spaced arms or bosses 2 from which project inwardly, trunnions or pins 3. A pair of circular disks or collars 4 and 5 are provided with complementary recesses 6 and 7 which together form oppositely extending radially disposed bearings for the pins or trunnions 3, carried by the shaft socket 1. As shown in Fig. 5, each of the collars or plates 4 and 5 is provided with facets or flattened peripheral portions 8 at the outer ends of the recesses 6 and 7, these flats or facets being adapted to abut against the finished inwardly presented surfaces of the arms or bosses 2, 2. As shown in Fig. 3, the other shaft socket 9 is provided with elongated arms 10 carrying at their outer extremities, oppositely presented bosses 11 and 12. The boss 11 is provided with a recess 13 which accommodates the head 14 of a stud or bolt provided with a shank 15 which is threaded at 16. Said shank 15 of the stud or bolt is adapted to extend through a hole 17 in the boss 11 and to be threaded into a threaded tap hole 18 in the other boss 12. The recess 13 is provided with an extension 19 which accommodates a leaf spring 20 which is contained therein and serves to yieldably engage the knurled head 14 of the stud or screw. This device constitutes locking means for holding the stud or bolt in any position to which it may be adjusted. In order to assemble the parts, the collars or plates 4 and 5 are arranged about the pins or trunnions 3 carried by the shaft socket 1 and then moved into the space between the bosses 11 and 12 of the shaft socket 9. When the coaxial bores of the plates or collars are brought into register with the holes 17 and 18, the stud or bolt is moved inwardly until the threaded end 16 thereof may be threaded into the screw threads 18 by turning said stud or bolt. As the stud or bolt is screwed home, it gradually draws the arms 10, which are made comparatively long for this purpose, into snug bearing contact with the lateral surfaces of the collars or plates 4 and 5. By means of this construction, the bearing contact may be made more or less snug as desired. Toward the end of the inward movement of the stud or bolt, the spring 20 yieldably engages the ratchet or knurled head 14 so that a releasing movement is presented unless the parts are intentionally manipulated for that purpose. By means of the flats or facets 8 in the peripheral surfaces of the plates or collars 4 and 5, said plates or collars are moved by the shaft socket 1 to swing about the shank 15 of the stud or bolt.

The advantageous features of this construction will be readily understood from the above description. By means of the yieldable arms 10, it is possible to take up all wear or looseness between the pins or trunnions 3, disks or collars 4 and 5 and the bearing pads 10' which are presented inwardly from the outer ends of yieldable arms 10. Inasmuch as the disks or washers 4 and 5 combined are of less thickness than the space between the bearing pads 10', the screw 15 serves by its adjustment to maintain the disks or washers 4 and 5 in flat bearing contact with said bearing pads 10'.

We claim:—

1. In a universal joint or coupling, members to be joined or coupled, each of said members having laterally spaced arms, laterally spaced plates or disks journaled between the arms of one of said members, studs carried by the arms of the other member, said studs being journaled between and separating said plates or disks, and means for imparting relative axial movements to said plates or disks to take up wear of the parts.

2. In a universal joint or coupling, members to be joined or coupled, laterally spaced plates or disks journaled in one of said members, means carried by the other member and journaled between said plates or disks, and means for imparting a relative axial adjustment to said plates or disks.

3. In a universal joint or coupling, members to be joined or coupled, relatively adjustable bearings pivotally connected to one of said members, means carried by the other of said members and having pivotal bearing engagement with said relatively adjustable bearings, and means for imparting a relative adjustment to said adjustable bearings.

4. In a universal joint or coupling, members to be joined or coupled, relatively adjustable bearings journaled in one of said members, means carried by the other of said members and having journaling engagement with said bearings, means for adjusting said bearings relatively to each other, and means for locking said adjusting means for retaining said bearings in their adjusted positions.

5. In a universal joint or coupling, a shaft socket having relatively short coupling arms, a second shaft socket having relatively long coupling arms to provide resiliency, axially movable collars or plates journaled on an axis extending between said relatively short arms of the first mentioned shaft socket and between the relatively long arms of the second mentioned shaft socket, a bolt for drawing said relatively long arms together against said plates or collars, said bolt having journaling connection with said collars or plates, and means for retaining said stud in adjusted position.

6. In a universal joint or coupling, shaft sockets to be joined or coupled, one of said shaft sockets being provided with oppositely arranged bearing lugs, a bolt journaled in one of the bearing lugs and threaded into the other bearing lug, disks or collars journaled on said bolt, said disks or collars being provided with complementary bearing recesses in their adjacently disposed faces, studs carried by the other shaft socket and journaling in said bearing recesses, and means releasably holding said bolt in adjusted position.

7. In a universal joint or coupling, shaft sockets to be joined or coupled, one of said shaft sockets being provided with oppositely arranged bearing lugs, a bolt journaled in one of the bearing lugs and threaded into the other bearing lug, disks or collars journaled on said bolt, said disks or collars being provided with complementary bearing recesses in their adjacently disposed faces, studs carried by the other shaft socket and journaling in said bearing recesses, and means releasably holding said threaded bolt in adjusted position.

8. In a universal joint or coupling, shaft sockets to be joined or coupled, one of said shaft sockets being provided with oppositely arranged bearing lugs, a bolt journaled in one of the bearing lugs and threaded into the other bearing lug, disks or collars journaled on said bolt, said disks or collars being provided with complementary bearing recesses in their adjacently disposed faces, studs carried by the other shaft socket and journaling in said bearing recesses, and means for holding the threaded bolt in any position to which it is adjusted.

9. In a universal joint or coupling, shaft sockets to be joined or coupled, one of said shaft sockets being provided with oppositely arranged bearing lugs, a bolt journaled in one of the bearing lugs and threaded into the other bearing lug, disks or collars journaled on said bolt, said disks or collars being provided with complementary bearing recesses in their adjacently disposed faces, studs carried by the other shaft socket and journaling in said bearing recesses, said threaded bolt or stud having a head, and means carried by the shaft socket for yieldably engaging said head.

10. In a universal joint or coupling, members to be joined or coupled, means for joining or coupling said members with a universal movement, said joining or coupling means including relatively adjustable bearings, and means for imparting relative adjustments to said bearings for taking up wear therebetween.

FRANK B. LOCKTON.
CARL E. CHRISTOPHEL.